US010713561B2

(12) United States Patent
Alvarez-Icaza Rivera et al.

(10) Patent No.: US 10,713,561 B2
(45) Date of Patent: Jul. 14, 2020

(54) MULTIPLEXING PHYSICAL NEURONS TO OPTIMIZE POWER AND AREA

(71) Applicant: INTERNATIONAL BUSINESS MACHINES CORPORATION, Armonk, NY (US)

(72) Inventors: Rodrigo Alvarez-Icaza Rivera, San Jose, CA (US); John V. Arthur, Mountain View, CA (US); Andrew S. Cassidy, San Jose, CA (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 14/845,147

(22) Filed: Sep. 3, 2015

(65) Prior Publication Data

US 2015/0379393 A1    Dec. 31, 2015

Related U.S. Application Data

(63) Continuation of application No. 13/619,433, filed on Sep. 14, 2012, now Pat. No. 9,159,020.

(51) Int. Cl.
*G06N 3/063* (2006.01)
*G06N 3/04* (2006.01)
*G06N 3/02* (2006.01)

(52) U.S. Cl.
CPC .............. *G06N 3/049* (2013.01); *G06N 3/02* (2013.01); *G06N 3/063* (2013.01)

(58) Field of Classification Search
CPC .......... G06N 3/02; G06N 3/049; G06N 3/063; G06N 3/08; G06N 3/04; C12Q 1/68;
(Continued)

(56) References Cited

U.S. PATENT DOCUMENTS

| 5,636,327 A | 6/1997 | Nakahira et al. |
| 5,701,397 A | 12/1997 | Steimle et al. |

(Continued)

FOREIGN PATENT DOCUMENTS

| CN | 101639901 A | 2/2011 |
| CN | 102193518 A | 9/2011 |

(Continued)

OTHER PUBLICATIONS

'Analog VLSI Implementation of Neural Systems': Mead, Kluwer Academic Publishers, 1989.*

(Continued)

*Primary Examiner* — Li B. Zhen
*Assistant Examiner* — Peter D Coughlan
(74) *Attorney, Agent, or Firm* — Sherman IP LLP; Kenneth L. Sherman; Hemavathy Perumal

(57) ABSTRACT

Embodiments of the invention relate to a multiplexed neural core circuit. One embodiment comprises a core circuit including a memory device that maintains neuronal attributes for multiple neurons. The memory device has multiple entries. Each entry maintains neuronal attributes for a corresponding neuron. The core circuit further comprises a controller for managing the memory device. In response to neuronal firing events targeting one of said neurons, the controller retrieves neuronal attributes for the target neuron from a corresponding entry of the memory device, and integrates said firing events based on the retrieved neuronal attributes to generate a firing event for the target neuron.

18 Claims, 15 Drawing Sheets

(58) Field of Classification Search
CPC ........ A61K 39/395; A61N 1/36; C07K 16/28; G01V 1/3808; G01V 1/3835
See application file for complete search history.

(56) References Cited

U.S. PATENT DOCUMENTS

| | | | |
|---|---|---|---|
| 5,819,245 | A | 10/1998 | Peterson et al. |
| 6,418,378 | B1* | 7/2002 | Nyland ............... G01V 1/3835 702/14 |
| 6,999,953 | B2 | 2/2006 | Ovhsinsky, Sr. et al. |
| 7,043,466 | B2 | 5/2006 | Watanabe et al. |
| 7,457,787 | B1 | 11/2008 | Furber |
| 7,533,071 | B2 | 5/2009 | Snook et al. |
| 7,627,540 | B2 | 12/2009 | Snook et al. |
| 7,849,034 | B2 | 12/2010 | Visel |
| 8,285,657 | B2 | 10/2012 | Edelman et al. |
| 8,606,732 | B2 | 12/2013 | Venkatraman et al. |
| 8,626,684 | B2 | 1/2014 | Modha |
| 8,655,813 | B2 | 2/2014 | Ananthanarayanan et al. |
| 8,682,822 | B2 | 3/2014 | Modha et al. |
| 8,699,566 | B2 | 4/2014 | Ananthanarayanan et al. |
| 8,712,940 | B2 | 4/2014 | Modha |
| 8,738,554 | B2 | 5/2014 | Modha |
| 8,799,199 | B2 | 8/2014 | Modha |
| 8,812,414 | B2 | 8/2014 | Arthur et al. |
| 8,812,415 | B2 | 8/2014 | Modha |
| 8,843,425 | B2 | 9/2014 | Modha |
| 8,856,055 | B2 | 10/2014 | Brezzo et al. |
| 8,868,477 | B2 | 10/2014 | Esser et al. |
| 8,874,498 | B2 | 10/2014 | Modha |
| 8,909,576 | B2 | 12/2014 | Akopyan et al. |
| 9,104,973 | B2 | 8/2015 | Izhikevich et al. |
| 9,224,089 | B2 | 12/2015 | Majumdar et al. |
| 2008/0103403 | A1* | 5/2008 | Cohen ................ G16H 50/20 600/509 |
| 2010/0241601 | A1* | 9/2010 | Carson ................ G06N 3/02 706/27 |
| 2011/0119215 | A1* | 5/2011 | Elmegreen ............ G06N 3/063 706/37 |
| 2011/0161625 | A1 | 6/2011 | Pechanek |
| 2011/0167245 | A1 | 7/2011 | Lavrov et al. |
| 2012/0109863 | A1* | 5/2012 | Esser .................. G06N 3/049 706/25 |
| 2013/0151793 | A1 | 6/2013 | Rudosky et al. |
| 2014/0222740 | A1 | 8/2014 | Alvarez-Icaza Rivera et al. |
| 2016/0321537 | A1 | 11/2016 | Akopyan |

FOREIGN PATENT DOCUMENTS

| | | |
|---|---|---|
| CN | 102663497 A | 9/2012 |
| CN | 102667826 A | 9/2012 |
| CN | 104145281 A | 11/2014 |
| JP | 6139217 A | 5/1994 |
| WO | 2012055593 A1 | 5/2012 |
| WO | 2013043903 A1 | 3/2013 |

OTHER PUBLICATIONS

'A Digital Neurosynaptic Core Using Embedded Crossbar Memory with 45pJ per Spike in 45nm' Merolla, Jul. 2011, IEEE.*

'T'he Deferred Event Model for Hardware-( )riented Spiking Neural Networks', Rast, 2008, ICONIP 2008.*

U.S. Notice of Allowance for U.S. Appl. No. 14/229,760 dated Aug. 11, 2017.

Yudanov, D. et al., "GPU-based simulation of spiking neural networks with real-time performance & high accuracy", Proceedings of the 2010 International Joint Conference on Neural Networks (IJCNN), Jul. 18-23, 2010, pp. 1-8, IEEE, United States.

Amir, A., et al., "Cognitive Computing Programming Paradigm: A Corelet Language for Composing Networks of Neurosynaptic Cores", Proceedings of the 2013 International Joint Conference on Neural Networks (IJCNN), Aug. 2013, pp. 1-10, IEEE, United States.

Rast, A.D. et al., "Virtual Synaptic Interconnect Using an Asynchronous Network-on-Chip" Proceedings of the 2008 International Joint Conference on Neural Networks (IJCNN), Jun. 1-8, 2008, pp. 2727-2734, IEEE, United States.

Moradi, S. et al., ""An Event-Based Neural Network Architecture With an Asynchronous X Programmable Synaptic Memory"", IEEE Transactions on Biomedical Circuits and Systems, Feb. 2014, pp. 98-107, vol. 8, No. 1, IEEE, United States.

U.S. Non-Final Office Action for U.S. Appl. No. 14/229,760 dated Apr. 20, 2017.

Strand, D., "Ovonics: From Science to Products", Journal of Optoelectronics and Advanced Materials, Aug. 2005, pp. 1679-1690, vol. 7, No. 4, JOAM, Romania.

Iyer, S.S. et al., "Embedded DRAM: Technology Platform for the Blue Gene/L Chip", IBM Journal of Research and Development, Mar. 2005, pp. 333-350, vol. 49, No. 2/3, IBM, USA.

Furber, S.B., "A Fascicle Impulse-Rate Encoded (FIRE) Neural Architecture", Oct. 2000, pp. 1-7, USA.

International Search Report and Written Opinion dated Feb. 6, 2014 for International PCT Application No. PCT/IB2013/056734 from the State Intellectual Property Office, the P.R. China, pp. 1-10, Beijing, China.

Preissl, R. et al., "Compass: A scalable simulator for an architecture for Cognitive Computing", In the Proceedings of the 2012 International Conference on High Performance Computing, Networking, Storage and Analysis (SC) Article 54, Nov. 10-16, 2012, pp. 1-11, IEEE Xplore, United States.

International Search Report and Written Opinion dated Jan. 2, 2014 for International PCT Application No. PCT/IBM2013/055312 from the State Intellectual Property Office, the P.R. China, pp. 107, Beijing, China.

Cattell, R. et al., "Challenges for Brain Emulation: Why is Building a Brain so Difficult?", Nat. Intell 1.3 (012) 17-31, Feb. 5, 2012, pp. 1-28, United States.

Imam, N. et al., "A Digital Neurosynaptic Core Using Event-Driven QDI Circuits", In the Proceedings of the 2012 IEEE 18th International Symposium on Asynchronous Circuits and Systems, May 7-9, 2012, pp. 25-32, IEEE Computer Society, United States.

Merolla, P. et al., "A Digital Neurosynaptic Core Using Embedded Crossbar Memory with 45pJ per Spike in 45nm", In the Proceedings of the 2011 Custom Integrated Circuits Conference (CICC), Sep. 19-21, 2011, pp. 1-4, IEEE Xplore, United States.

Patterson, C., "Scalable communications for a million-core neural processing architecture", Journal of Parallel and Distributed Computing, Feb. 4, 2012, pp. 1507-1520, vol. 72, Issue 11, Elsevier, United States.

Pourhaj, P. et al., "FPGA Based Pipelined Architecture for Action Potential Simulation in Biological Neural Systems", Proceedings of the 23rcd Canadian Conference on Electrical and Computer Engineering (CCECE), May 2-5, 2010, pp. 1-4, IEEE, United States.

Arthur, J.V. et al., "Building Block of a Programmable Neuromorphic Sustrate: A Digital Neurosynaptic Core", Proceedings of the 2012 International Joint Conference on Neural Networks (IJCNN), Jun. 10-15, 2012, pp. 1-8, IEEE, United States.

Ago, Y. et al., "The Parallel FDFM Processor Core Approach for Neural Networks", Proceedings of the 2011 Second International Conference on Networking and Computing, Nov. 30, 2011-Dec. 2, 2011, pp. 113-119, IEEE, United States.

Schaefer, M. et al., "Simulation of spiking neural networks—architectures and implementations", Neurocomputing, 2002, pp. 647-679, vol. 48, Elsevier, United States.

Hafuger, P.D., "Neuromorphic Electronics—Lecture Notes", Lecture Notes, University of Oslo, Department of Informatics, 2010, pp. i, iii-iv, 49-57, 65, 67-68, 127-129, UIO, United States.

Ros, E., et al., "Real-Time Computing Platform for Spiking Neurons (RT-Spike)", IEEE Transactions on Neural Networks, Jul. 2016, pp. 1050-1063, vol. 178, No. 4, IEEE, United States.

Schrauwen, B. et al,, "Compact hardware liquid state machines on FPGA for real-time speech recognition", Neural Networks, 2008, pp. 511-523, vol. 21, Elsevier, United States.

(56) References Cited

OTHER PUBLICATIONS

Patterson, J.C., "Managing a real-time massively-parallel neural architecture", Thesis, The University of Manchester, Sep. 8, 2012, pp. 1-3, 17-21, 39-40, 44-45, 47-54, 58-59, Manchester, United Kingdom.
Rast, A.D. et al,, "The Deferred Event Model for Hardware-Oriented Spiking Neural Networks" Proceedings of the 15th international Conference on Advances in Neuro-Inforrhation Processing (ICONIP 2008), Nov. 25-28, 2008, pp. 1057-1064, Springer, Berlin, Heidelberg.
U.S. Notice of Allowance for U.S. Appl. No. 13/683,234 dated Nov. 14, 2014.
U.S. Non-Final Office Action for U.S. Appl. No. 13/619,433 dated Nov. 19, 2014.
U.S. Notice of Allowance for U.S. Appl. No. 13/619,433 dated Jun. 9, 2015.

\* cited by examiner

511 — Information Regarding Neuron 0 in Core 0 | Information Regarding Neuron 1 in Core 0 | ... | Information Regarding Neuron N-1 in Core 0

510 — Information Regarding Neuron 0 in Core 1 | Information Regarding Neuron 1 in Core 1 | ... | Information Regarding Neuron N-1 in Core 1

512 — Information Regarding Neuron 0 in Core 2 | Information Regarding Neuron 1 in Core 2 | Information Regarding Neuron N-1 in Core 2

FIG. 13

| 614 | 610 | | | | | | | | | | 611 | | | | | | | | | 612 |
|---|---|---|---|---|---|---|---|---|---|---|---|---|---|---|---|---|---|---|---|---|
| | Information Regarding Neuron 0 in Core 0 | Information Regarding Neuron 1 in Core 0 | ... | Information Regarding Neuron N-1 in Core 0 | Information Regarding Neuron 0 in Core 1 | Information Regarding Neuron 1 in Core 1 | ... | Information Regarding Neuron N-1 in Core 1 | Information Regarding Neuron 0 in Core 2 | Information Regarding Neuron 1 in Core 2 | Information Regarding Neuron N-1 in Core 2 | Information Regarding Neuron 0 in Core 3 | Information Regarding Neuron 1 in Core 3 | ... | Information Regarding Neuron N-1 in Core 3 | Information Regarding Neuron 0 in Core 4 | Information Regarding Neuron 1 in Core 4 | ... | Information Regarding Neuron N-1 in Core 4 | Information Regarding Neuron 0 in Core 5 | Information Regarding Neuron 1 in Core 5 | Information Regarding Neuron N-1 in Core 5 | Information Regarding Neuron 0 in Core 6 | Information Regarding Neuron 1 in Core 6 | ... | Information Regarding Neuron N-1 in Core 6 | Information Regarding Neuron 0 in Core 7 | Information Regarding Neuron 1 in Core 7 | ... | Information Regarding Neuron N-1 in Core 7 | Information Regarding Neuron 0 in Core 8 | Information Regarding Neuron 1 in Core 8 | Information Regarding Neuron N-1 in Core 8 |

FIG. 15

MULTIPLEXING PHYSICAL NEURONS TO OPTIMIZE POWER AND AREA

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, a multiplexed neural core circuit.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to a multiplexed neural core circuit. One embodiment comprises a core circuit including a memory device that maintains neuronal attributes for multiple neurons. The memory device has multiple entries. Each entry maintains neuronal attributes for a corresponding neuron. The core circuit further comprises a controller for managing the memory device. In response to neuronal firing events targeting one of said neurons, the controller retrieves neuronal attributes for the target neuron from a corresponding entry of the memory device, and integrates said firing events based on the retrieved neuronal attributes to generate a firing event for the target neuron.

Another embodiment comprises maintaining neuronal attributes for multiple neurons in a memory device. The memory device has multiple entries. Each entry maintains neuronal attributes for a corresponding neuron. In response to neuronal firing events targeting one of said neurons, neuronal attributes for the target neuron are retrieved from a corresponding entry of the memory device, and said firing events are integrated based on the retrieved neuronal attributes to generate a firing event for the target neuron.

These and other features, aspects and advantages of the present invention will become understood with reference to the following description, appended claims and accompanying figures.

BRIEF DESCRIPTION OF THE SEVERAL VIEWS OF THE DRAWINGS

FIG. 13 is a block diagram showing a wide memory device of a wide meta-core, in accordance with an embodiment of the invention;

FIG. 15 is a block diagram showing a memory device of a meta-core, in accordance with an embodiment of the invention;

DETAILED DESCRIPTION

Figure 1:
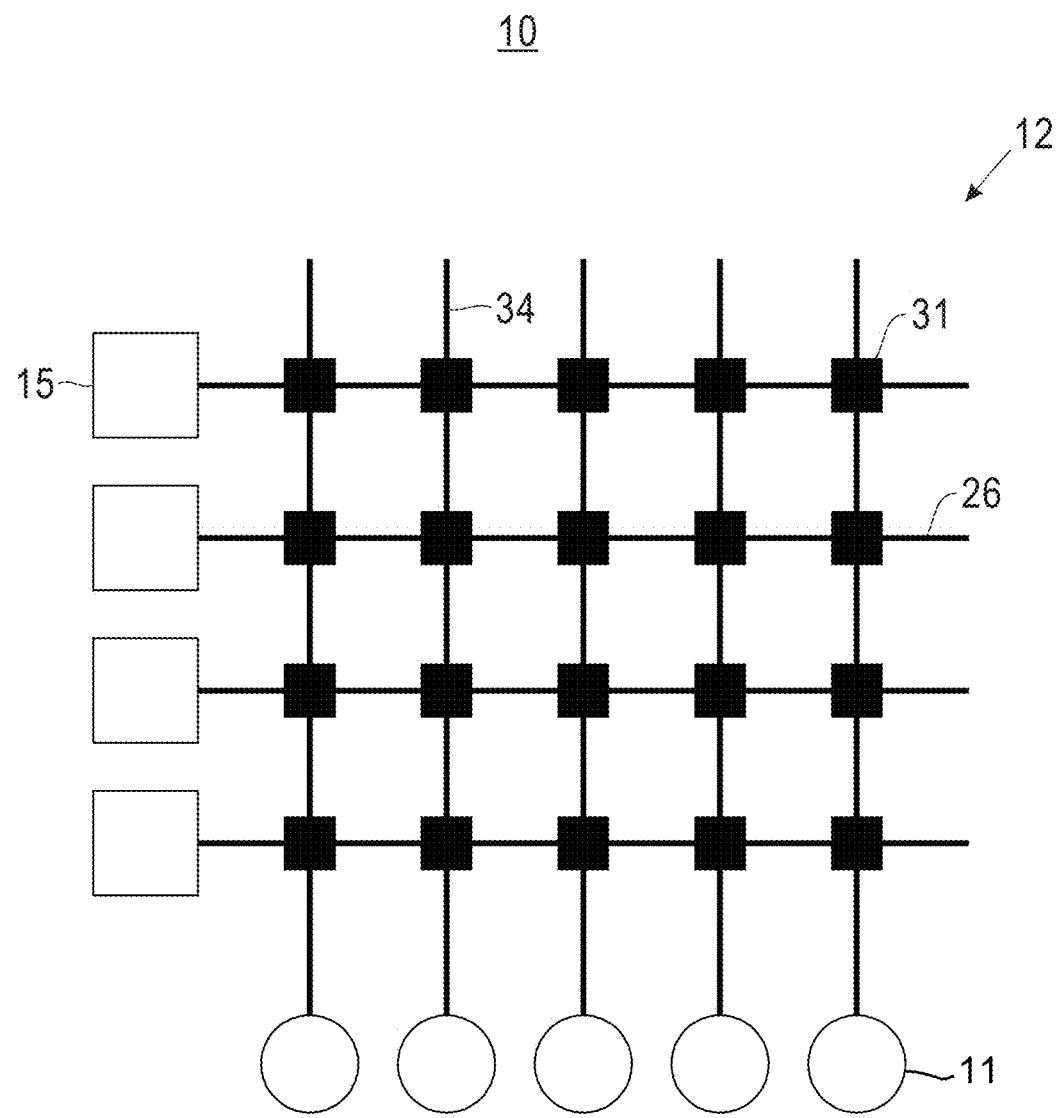
FIG. 1 illustrates a neural core circuit, in accordance with an embodiment of the invention.

Embodiments of the invention relate to a multiplexed neural core circuit. One embodiment comprises a core circuit including a memory device that maintains neuronal attributes for multiple neurons. The memory device has multiple entries. Each entry maintains neuronal attributes for a corresponding neuron. The core circuit further comprises a controller for managing the memory device. In response to neuronal firing events targeting one of said neurons, the controller retrieves neuronal attributes for the target neuron from a corresponding entry of the memory device, and integrates said firing events based on the retrieved neuronal attributes to generate a firing event for the target neuron.

Another embodiment comprises maintaining neuronal attributes for multiple neurons in a memory device. The memory device has multiple entries. Each entry maintains neuronal attributes for a corresponding neuron. In response to neuronal firing events targeting one of said neurons, neuronal attributes for the target neuron are retrieved from a corresponding entry of the memory device, and said firing events are integrated based on the retrieved neuronal attributes to generate a firing event for the target neuron.

Each entry of the memory device maintains the following neuronal attributes for a corresponding neuron: synaptic connectivity information, neuron parameters, and routing data information. The controller generates a firing event for a target neuron if integrated firing events exceed a threshold neuron parameter for said target neuron.

For each target neuron, the controller updates at least one neuron parameter for said target neuron.

The controller multiplexes computation and control logic for multiple neurons. For each neuron that corresponds to an entry of the memory device, the controller receives incoming firing events targeting said neuron, and retrieves synaptic connectivity information for said neuron from the corresponding entry of the memory device.

For each neuron that corresponds to an entry of the memory device, the controller retrieves neuron parameters for said neuron from the corresponding entry of the memory device, and integrates incoming firing events targeting said neuron, wherein the incoming firing events are integrated based on the neuron parameters and synaptic connectivity for said neuron. The controller generates an outgoing firing event when the integrated incoming firing events exceed a threshold neuron parameter for said neuron, wherein the outgoing firing event is generated based on the routing data information for said neuron. The controller updates at least one neuron parameter for said neuron.

For each time step, each entry of the memory device is read out sequentially.

In one embodiment, the memory device is a memory array including multiple partitions. A first partition maintains synaptic connectivity information for multiple neurons, a second partition maintains neuron parameters for the neurons, and a third partition maintains routing data information for the neurons.

In another embodiment, the memory device includes multiple memory arrays. A first memory array maintains synaptic connectivity information for multiple neurons, a second memory array maintains neuron parameters for the neurons, and a third memory array maintains routing data information for the neurons.

The term digital neuron as used herein represents an framework configured to simulate a biological neuron. An digital neuron creates connections between processing elements that are roughly functionally equivalent to neurons of a biological brain. As such, a neuromorphic and synaptronic computation comprising digital neurons according to embodiments of the invention may include various electronic circuits that are modeled on biological neurons. Further, a neuromorphic and synaptronic computation comprising digital neurons according to embodiments of the invention may include various processing elements (including computer simulations) that are modeled on biological neurons. Although certain illustrative embodiments of the invention are described herein using digital neurons comprising digital circuits, the present invention is not limited to digital circuits. A neuromorphic and synaptronic computation according to embodiments of the invention can be implemented as a neuromorphic and synaptronic framework comprising circuitry, and additionally as a computer simulation. Indeed, embodiments of the invention can take the form of an entirely hardware embodiment, an entirely software embodiment or an embodiment containing both hardware and software elements.

FIG. 1 illustrates a neural core circuit 10, in accordance with an embodiment of the invention. The neural core circuit 10 is a neurosynaptic core circuit. The core circuit 10 comprises multiple pre-synaptic axons 15 and multiple post-synaptic neurons 11. Each neuron 11 has configurable operational parameters. The core circuit 10 further comprises a synaptic crossbar 12 including multiple synapses 31, multiple rows/axon paths 26, and multiple columns/dendrite paths 34.

Each synapse 31 communicates firing events (e.g., spike events) between a pre-synaptic axon 15 and a post-synaptic neuron 11. Specifically, each synapse 31 is located at crosspoint junction between an axon path 26 and a dendrite path 34, such that a connection between the axon path 26 and the dendrite path 34 is made through said synapse 31. Each axon 15 is connected to an axon path 26, such that said axon 15 sends spikes to the connected axon path 26. Each neuron 11 is connected to a dendrite path 34, such that said neuron 11 receives spikes from the connected dendrite path 34.

Each synapse 31 has a synaptic weight. The synaptic weights of the synapses 31 of the core circuit 10 may be represented by a weight matrix W, wherein an element $W_{ji}$ of the matrix W represents a synaptic weight of a synapse 31 located at a row/axon path j and a column/dendrite path i of the crossbar 12. In one embodiment, the synapses 31 are binary memory devices. Each synapse 31 can have a weight "0" indicating that said synapse 31 is non-conducting, or a weight "1" indicating that said synapse 31 is conducting. A learning rule such as spike-timing dependent plasticity (STDP) may be applied to update the synaptic weights of the synapses 31.

Figure 2:
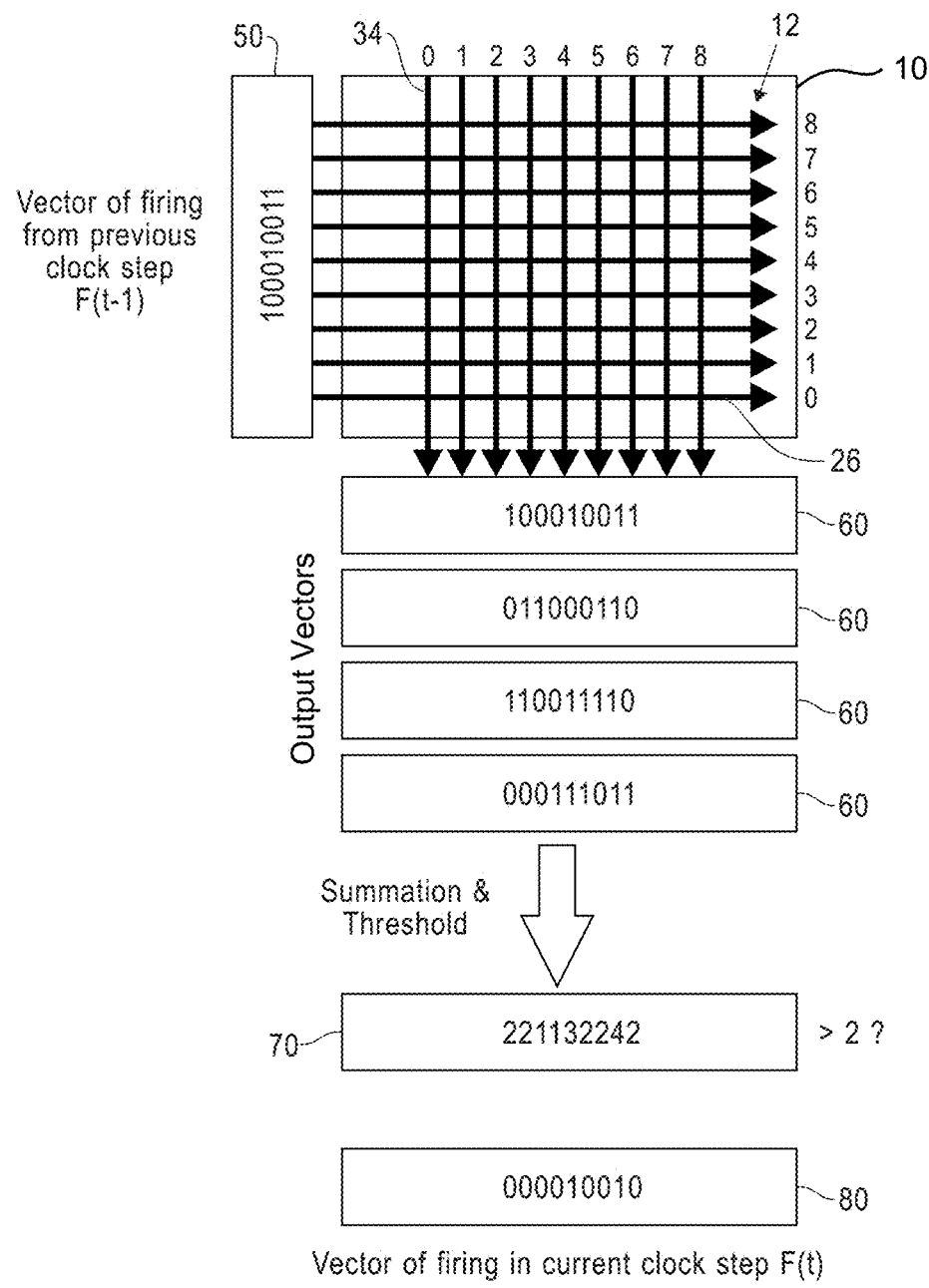
FIG. 2 illustrates the operation of a core circuit upon receiving an input vector of firing events, in accordance with an embodiment of the invention.

FIG. 2 illustrates the operation of a core circuit 10 (FIG. 1) upon receiving an input vector 50 of firing events, in accordance with an embodiment of the invention. At every time step (clock step) t, the axons 15 (FIG. 1) of the core circuit 10 receive a binary input vector ("input vector") 50. The input vector 50 represents the axons 15 that received firing events generated in a previous clock step t−1. Each index of the input vector 50 corresponds to an axon 15. Each index of the input vector 50 with a binary value of 1 indicates that a corresponding axon 15 received a firing event. Each index of the input vector 50 with a binary value of 0 indicates that a corresponding axon 15 did not receive a firing event.

For each index of the input vector 50 with a binary value of 1, the weight of the synapses 31 located at an axon path/row 26 of a corresponding axon 15 is read out to obtain a binary output vector ("output vector") 60. For an output vector 60 corresponding to an axon 15, each index of the output vector 60 corresponds to a synapse 31 located at the axon path/row 26 of the axon 15. Each index of an output vector 60 with a binary value of 1 indicates that a corresponding synapse 31 is a conducting synapse 31. Each index of an output vector 60 with a binary value of 0 indicates that a corresponding synapse 31 is a non-conducting synapse 31.

For example, as shown in FIG. 2, at time step F(t), the axons 15 receive an input vector 50 with values <1,0,0,0,1, 0,0,1,1>. The values <1,0,0,0,1,0,0,1,1> indicate that the axons 15 connected to axon paths/rows 0, 4, 7, and 8 of the crossbar 12 received firing events generated in a previous clock step F(t−1). The weight of the synapses 31 located at each axon path/row 0, 4, 7, and 8 are read out during the time step F(t). The output vectors 60 corresponding to rows 0, 4, 7, and 8 are <1,0,0,0,1,0,0,1,1>, <0,1,1,0,0,0,1,1,0>, <1,1,0,0,1,1,1,1,0>, and <0,0,0,1,1,1,0,1,1>, respectively.

As stated above, each index of an output vector 60 with a binary value of 1 indicates that a corresponding synapse 31 is a conducting synapse 31. Each neuron 11 receives a firing event from an interconnected axon 15 via a conducting synapse 31. Each neuron 11 integrates the firing events received into a membrane potential variable V of said neuron 11.

For example, in FIG. 2, a sequence 70 of numbers is shown, wherein each number of the sequence 70 corresponds to a neuron 11 of the core circuit 10. Each number of the sequence 70 represents the number of firing events that a corresponding neuron 11 received in the current time step t. Neurons 11 connected to dendrite paths/columns 0, 1, 2, . . . , and 8 of the crossbar 12 received two firing events, two firing events, one firing event, one firing event, three firing events, two firing events, two firing events, four firing events, and two firing events, respectively.

Each neuron 11 generates a firing event if the number of firing events integrated by said neuron 11 in the current time step t exceeds a firing threshold of said neuron 11. A binary update vector ("update vector") 80 representing the firing neurons 11 in the current time step t is obtained. Each index of the update vector 80 corresponds to a neuron 11. Each index with a binary value of 1 indicates that a corresponding neuron 11 generated a firing event in the current time step t.

For example, each neuron 11 of the core circuit 10 may have a spiking threshold equal to two (i.e., a neuron 11 fires if the neuron 11 receives more than two firing events). As shown in FIG. 2, the binary update vector 80 with values <0,0,0,0,1,0,0,1,0> indicates that the neurons 11 connected to dendrite paths/columns 4 and 7 of the crossbar 12 generated a firing event in the current time step F(t). As stated above, the neurons 11 connected to dendrite paths/columns 4 and 7 each received more than two firing events.

Figure 3:
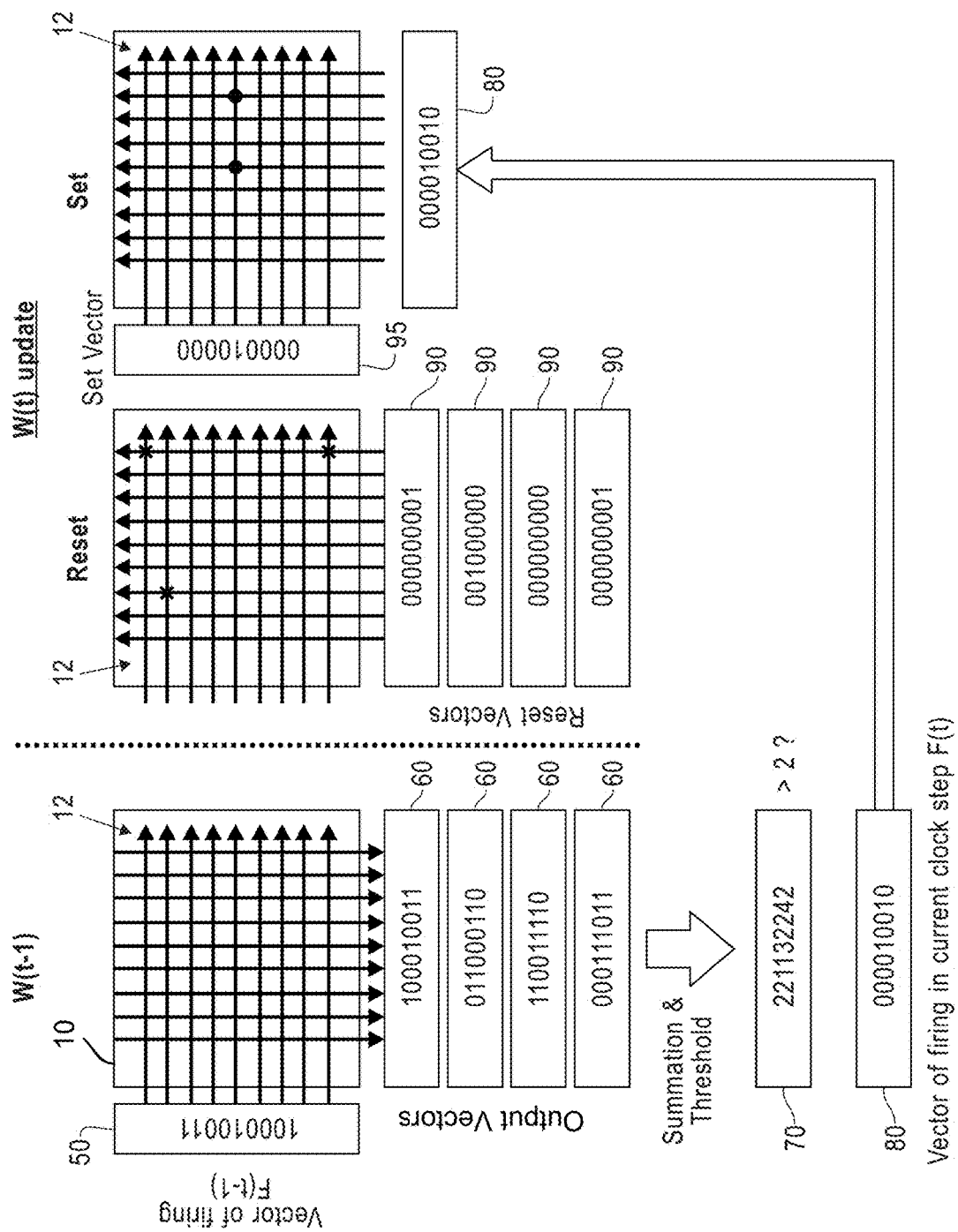
FIG. 3 illustrates resetting and setting operations for a core circuit, in accordance with an embodiment of the invention.

FIG. 3 illustrates resetting and setting operations for a core circuit 10, in accordance with an embodiment of the invention. Resetting operations and setting operations facilitate synaptic learning, such as STDP. In one embodiment, the synaptic weight of each synapse 31 that is connected to an active axon 15 (FIG. 1) is reset. An active axon 15 is an axon 15 that received a firing event in the current time step or a recent time step. If a synapse 31 connected to an active axon 15 is binary, the synaptic weight of the synapse 31 is reset to 0. If a synapse 31 connected to an active axon 15 is non-binary, the synaptic weight of the synapse 31 is reduced.

For example, as shown in FIG. 3, for each index of the input vector 50 with a binary value of 1, a binary reset vector 90 for an axon 15 corresponding to said index is generated. For a reset vector 90 for an axon 15, each index of the reset vector 90 with a binary value of 1 indicates that a synapse 31 connected to the axon 15 is reset.

In one embodiment, the synaptic weight of each synapse 31 that is connected to an active neuron 11 (FIG. 1) is set. An active neuron 11 is a neuron 11 that generated a firing event in the current time step or a recent time step. If a synapse 31 connected to an active neuron 11 is binary, the synaptic weight of the synapse 31 is set to 1. If a synapse 31 connected to an active neuron 11 is non-binary, the synaptic weight of the synapse 31 is increased.

For example, as shown in FIG. 3, for each index of the update vector 80 with a binary value of 1, a binary set vector 95 for a neuron 11 corresponding to said index is generated. For a set vector 95 for a neuron 11, each index of the set vector 95 with a binary value of 1 indicates that a synapse 31 connected to the neuron 11 is set.

In one embodiment, a neural core circuit comprising N neurons further comprises a controllers for the N neurons, wherein α is a positive integer and 1≤α<N, and the neurons are digital neurons. Each controller is a processing and computation logic circuit.

Figure 4:
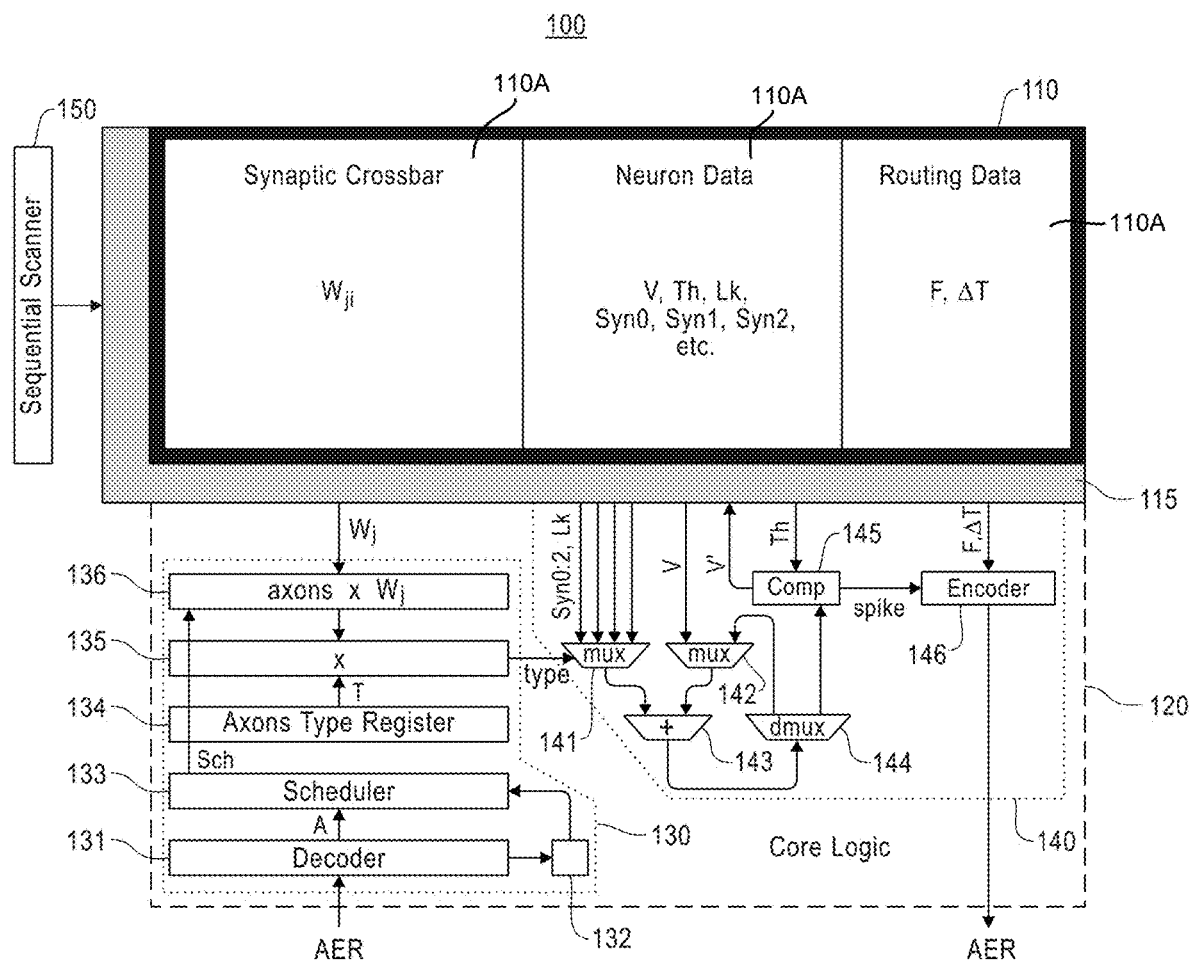
FIG. 4 illustrates a multiplexed neural core circuit, in accordance with an embodiment of the invention.

FIG. 4 illustrates a multiplexed neural core circuit 100, in accordance with an embodiment of the invention. The core circuit 100 is a multiplexed neurosynaptic core circuit. The core circuit 100 multiplexes computation and control logic for multiple neurons 11. Specifically, the core circuit 100 comprises a memory device 110 maintaining neuronal attributes for multiple neurons 11. The core circuit 100 further comprises a controller (i.e., a processing and computation logic circuit) 120 for the memory device 110.

Figure 5:
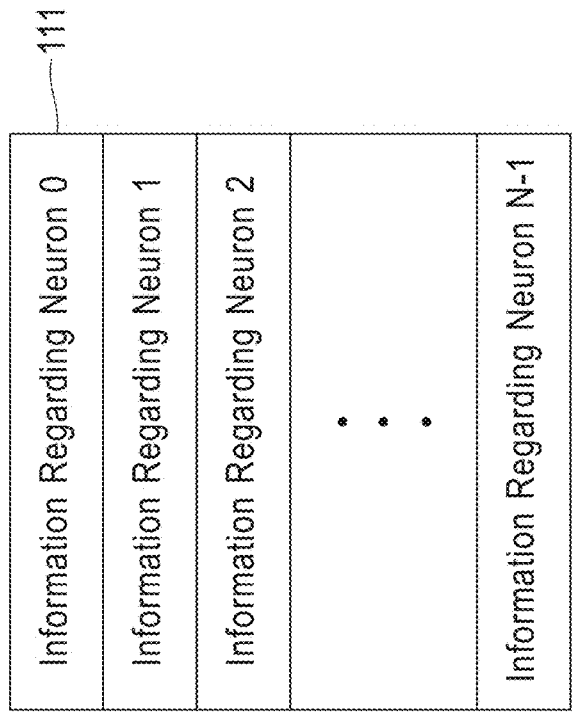
FIG. 5 is a block diagram showing a memory device of a multiplexed core circuit, in accordance with an embodiment of the invention.

The memory device 110 includes multiple entries 111 (FIG. 5). Each entry 111 maintains neuronal attributes for a neuron 11. In one embodiment, each entry 111 maintains the following neuronal attributes for a neuron 11: synaptic connectivity information ($W_{ji}$), neuron parameters, and routing information. In one embodiment, a first subset 112 of each entry 111 maintains synaptic weights of synapses 31 interconnecting a neuron 11 to axons 15. A second subset 113 of each entry 111 maintains the following neuron parameters for a neuron 11: membrane potential variable (V), spike threshold (Th), leak rate (Lk), and weights of each possible axon type (Syn0, Syn1, Syn2). A third subset 114 of each entry 111 further maintains the following routing information for a neuron 11: fanout (F), and routing delay (ΔT).

The memory device 110 is divided into multiple segments 110A. In one embodiment, the memory device 110 is a single memory array. The memory array may include multiple partitions 110A, such as a first partition 110A maintaining synaptic connectivity information for multiple neurons 11, a second partition 110A maintaining neuron parameters for the neurons 11, and a third partition 110A maintaining routing data information for the neurons 11. In another embodiment, the memory device 100 has multiple memory arrays. A first memory array maintains synaptic connectivity information for multiple neurons 11, a second memory array maintains neuron parameters for the neurons 11, and a third memory array maintains routing data information for the neurons 11.

The memory device 110 further includes a memory interface circuit 115. The circuit 115 may be a standard memory interface circuit.

In one embodiment, the controller 120 comprises an input processing fabric 130 and a computation fabric 140. For each entry 111, the processing fabric 130 is configured to receive and process firing events targeting said entry 111. Specifically, each firing event received targets an axon 15 that a neuron 11 represented by said entry 111 is interconnected to. As indicated above, a first subset 112 of each entry 111 maintains synaptic weights of synapses 31 interconnecting a neuron 11 to axons 15. If the synapse 31 interconnecting the targeted axon 15 and the neuron 11 represented by said entry 111 is conducting, said firing event may be integrated by the computation fabric 140.

In one embodiment, the processing fabric 130 comprises a decoder 131, a scheduler control unit 132, a scheduler 133, an axon type register 134, a multiplexing control unit 135, and a dot product module 136.

In a neural network comprising multiple core circuits 100, firing events are routed between core circuits 100 of the neural network in the form of address-event packets. Each address-event packet includes a firing event encoded as a binary address representing a target axon 15, wherein the firing event was generated by a neuron 11 in the same core circuit 100 or a different core circuit 100. Each address-event packet further includes a time stamp indicating when a firing event encapsulated in said address-event packet was generated. The decoder 131 of each core circuit 100 is configured for receiving and decoding address-event packets.

In one example implementation, the scheduler 133 is a dual port memory including rows and columns. Firing events decoded from received address-event packets are stored in the scheduler 133, wherein rows represent future time steps and columns represents axons 15. For each firing event, the scheduler control unit 132 controls which row and column of the scheduler 133 that the firing event is written to. A delay is selectively imposed on received firing events before transmitting them to target axons 15. For each firing event, the scheduler control unit 132 computes the length of time said firing event has spent on route to the decoder 131 as the difference d between the arrival time of the address-event packet at the decoder 131 and the time stamp indicating when the firing event was generated. If the difference d is less than a predetermined delivery delay (or predetermined total delay) n, the firing event is held in the scheduler 133 for a delay period D equal to the difference between n and d, to achieve n timestamps from firing event generation to firing event delivery, and the scheduler 133 delivers the firing event at the end of the delay period.

For example, if a spike requires between 3 and 9 time steps to propagate in a neural network, the scheduler 133 ensures 9 time steps for all spikes. In one example, even if a spike arrives at the decoder 131 within 3 time steps from generation, the scheduler 133 delays transmission of that spike by 6 time steps such that the spike is transmitted from the scheduler 133 at the end of 9 time steps from spike generation.

At the beginning of each time step, a vector indicating all active axons 15 in the current time step is read from the scheduler 133 as a row. The entire memory device 110 is then read and written once per time step.

Specifically, for each time step, entries 111 of the memory device 110 are sequentially read out one at a time using a sequential scanner 150. The multiplexing control unit 135 is configured to send control signals to the memory device 110. For each entry 111 representing a neuron 11, the dot product module 136 computes the dot product between the vector of active axons 15 in the current time step and the synaptic connectivity information maintained in said entry 111, i.e., the synaptic weights of all synapses 31 the dendrite path 34 of the neuron 11 is connected to (Wj).

The axon type register 134 maintains different commands, and sends the computation fabric 140 commands based on the axon type (i.e., Syn0, Syn1, Syn2, etc.). Each command maintained corresponds to an index of the dot product computed. In one embodiment, the synaptic weights maintained in the memory device 110 are binary values. The axon type register 134 sends the computation fabric 140 commands that correspond to indices of the dot product with non-zero values. For example, if the dot product computed has values <1,1,1,0,0,0> and the axon type register maintains the values <0,1,2,3,1,2>, the axon type register 134 sends the computation fabric 140 the commands 0, 1, 2.

The multiplexing control unit 135 is further configured to combine the dot product computed and the firing events to create signals and commands to send to the computation fabric 140. The signals created include clock signals/time steps.

In another embodiment, the synaptic weights maintained in the memory device 110 are non-binary. The axon type register 134 sends the computation fabric 140 each non-zero value of the dot product multiplied by the command corresponding to the index of the dot product with said non-zero value. For example, if dot product computed has values <2,1,3,0,0,0> and the axon type register maintains the values <0,1,2,3,1,2>, the axon type register 134 sends (0,2), (1,1), and (2,3) to the computation fabric 140.

In one embodiment, the computation fabric 140 comprises a first multiplexer 141, a second multiplexer 142, an adder 143, a demultiplexer 144, a comparator module ("comparator") 145, and an encoder 146.

For each entry 111, the first multiplexer 141 uses information provided by the multiplexing control unit 135 to select a neuron parameter (i.e., Syn0, Syn1, Syn2, Lk). For example, the leak rate Lk maintained in said entry 111 is selected after all spikes are integrated. The adder 143 adds the neuron parameter selected by the first multiplexer 141 to a membrane potential variable selected by the second multiplexer 142. For each entry 111, the second multiplexer 142 selects the membrane potential variable V maintained in said entry 111 for the first addition. For each entry 111, the second multiplexer 142 selects a modified membrane potential variable for subsequent additions, wherein the modified membrane potential variable is a temporary variable.

For each entry 111, after all spikes are integrated and the leak rate is applied, the comparator 145 determines whether the modified membrane potential variable exceeds a threshold parameter Th maintained in said entry 111. If the threshold parameter Th is exceeded, the encoder 146 generates a spike and uses the fanout F and the routing delay ΔT information maintained in said entry 111 to encapsulate/encode the generated spike into an address-event packet. The membrane potential variable V may be reset to zero before it is written back to said entry 111.

Table 1 below provides example pseudo code, demonstrating the execution of the controller 120.

TABLE 1

```
for i=0 to NumAxonEvents−1
    write A(i) to scheduler
read Sch(t,:)
for j=0 to 255
    read W(j,:), V(j), Th(j), Lk(j), Syn(j,:)
    for i=0 to 255
        if Sch(t,i)==1 and W(j,i)==1
            V(j) += Syn( j,T(i) )
    V(j) += Lk(j)
    if V(j) > Th(j)
        V(j) = 0 ; Send Spike j
    write V(j)
```

In another example implementation, the scheduler 133 is configured for double buffering. For example, the scheduler 133 may include a first buffer and a second buffer. The scheduler 133 buffers firing events it receives in the current time step t in the first buffer. At the beginning of the next time step t+1, the scheduler 133 shifts the firing events in the first buffer to the second buffer. Each firing event may be delivered to a target axon 15 in the time step t+1 or subsequent time steps, depending on the programmed delivery time for said firing event.

FIG. 5 is a block diagram showing a memory device 110 of a multiplexed core circuit 100, in accordance with an embodiment of the invention. As stated above, the memory device 110 maintains information relating to multiple neurons 11. The memory device 110 includes multiple entries 111. Each entry 111 maintains neuronal attributes for a neuron 11.

Figure 6:
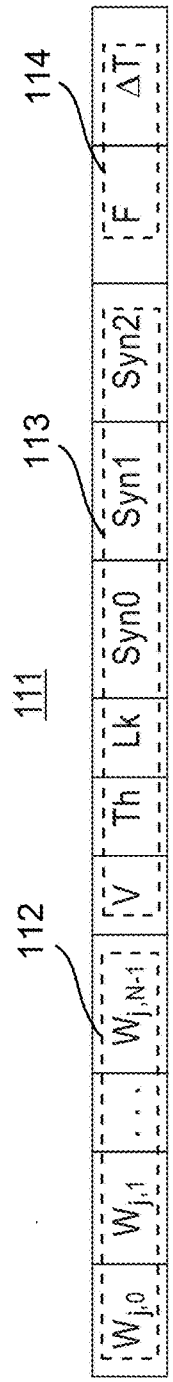
FIG. 6 is a block diagram showing information maintained within an entry of a memory device of a multiplexed core circuit, in accordance with an embodiment of the invention.

FIG. 6 is a block diagram showing information maintained within an entry 111 of a memory device 110 of a multiplexed core circuit 100, in accordance with an embodiment of the invention. In one embodiment, each entry 111 maintains the following neuronal attributes for a neuron 11: synaptic connectivity information, neuron parameters, and routing information. In one embodiment, a first subset 112 of each entry 111 maintains synaptic weights of synapses 31 interconnecting a neuron 11 to axons 15. A second subset 113 of each entry 111 maintains the following neuron parameters for a neuron 11: membrane potential variable (V), spike threshold (Th), leak rate (Lk), and weights of each possible axon type (Syn0, Syn1, Syn2). A third subset 114 of each entry 111 further maintains the following routing information for a neuron 11: fanout (F), and routing delay (ΔT).

Figure 7:
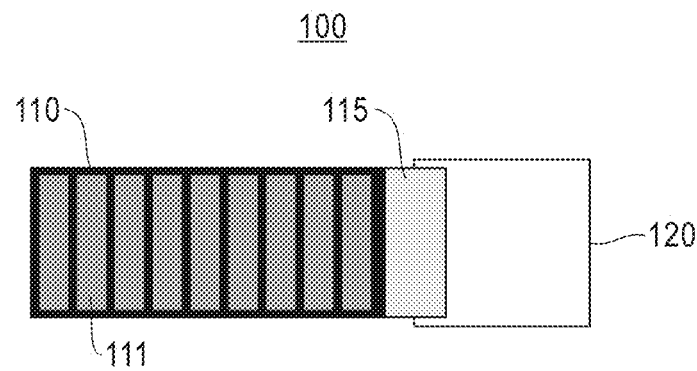
FIG. 7 is a block diagram showing a multiplexed core circuit, in accordance with an embodiment of the invention.

FIG. 7 is a block diagram showing a multiplexed core circuit 100, in accordance with an embodiment of the invention. As stated above, the core circuit 100 comprises a memory device 110 including multiple entries 111. Each entry 111 maintains information pertaining to a neuron 11. The core circuit 100 further comprises a controller (i.e., a processing and computation logic circuit) 120 for the memory device 110. A memory interface circuit 115 bridges the memory device 110 with the controller 120.

Figure 8:
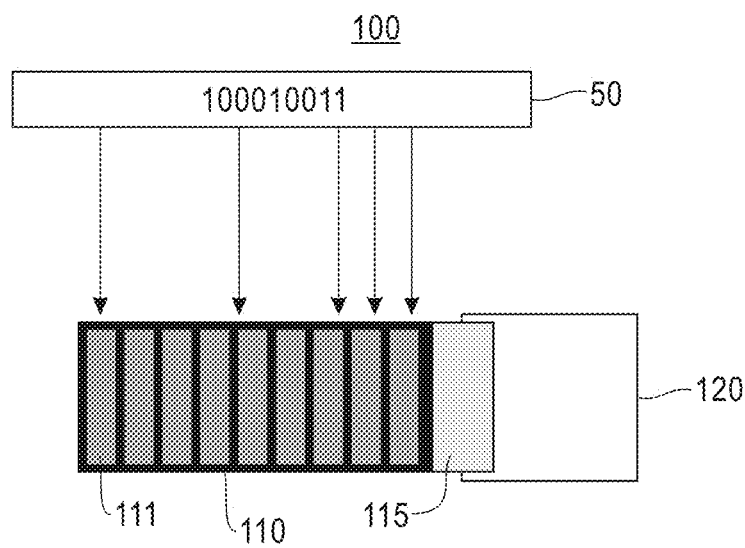
FIG. 8 is a block diagram showing a multiplexed core circuit receiving a binary input vector, in accordance with an embodiment of the invention.

FIG. 8 is a block diagram showing a multiplexed core circuit 100 receiving a binary input vector 50, in accordance with an embodiment of the invention. As stated above, at the beginning of each time step, a binary input vector 50 indicating all active axons 15 in the current time step is obtained from the scheduler 133. Each entry 111 of the memory device 110 is then sequentially read out one at a time.

Figure 9:
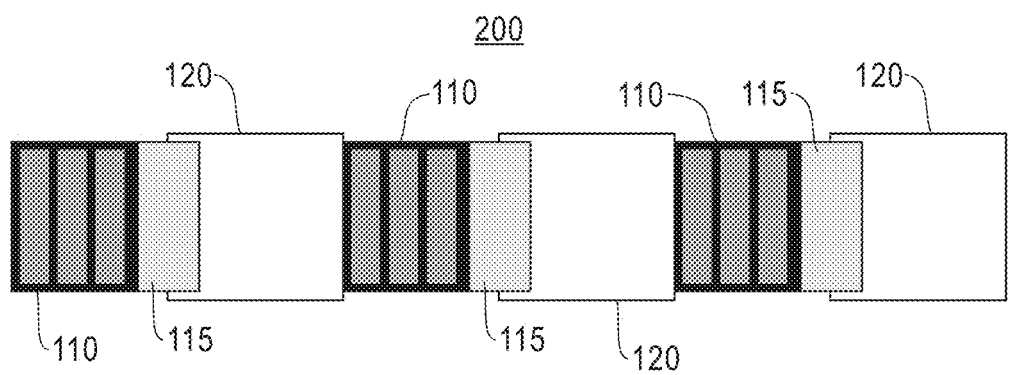
FIG. 9 is a block diagram showing a semi-multiplexed core circuit, in accordance with an embodiment of the invention.

FIG. 9 is a block diagram showing a semi-multiplexed core 200, in accordance with an embodiment of the invention. The core 200 comprises multiple memory devices 110. Each memory device 110 has a corresponding controller (i.e., a corresponding processing and computation logic circuit) 120. In one embodiment, a core 200 comprising N neurons may comprise α controllers (i.e., processing and computation logic circuits) for the N neurons, wherein α is a positive integer and $1 \leq \alpha < N$.

Figure 10:
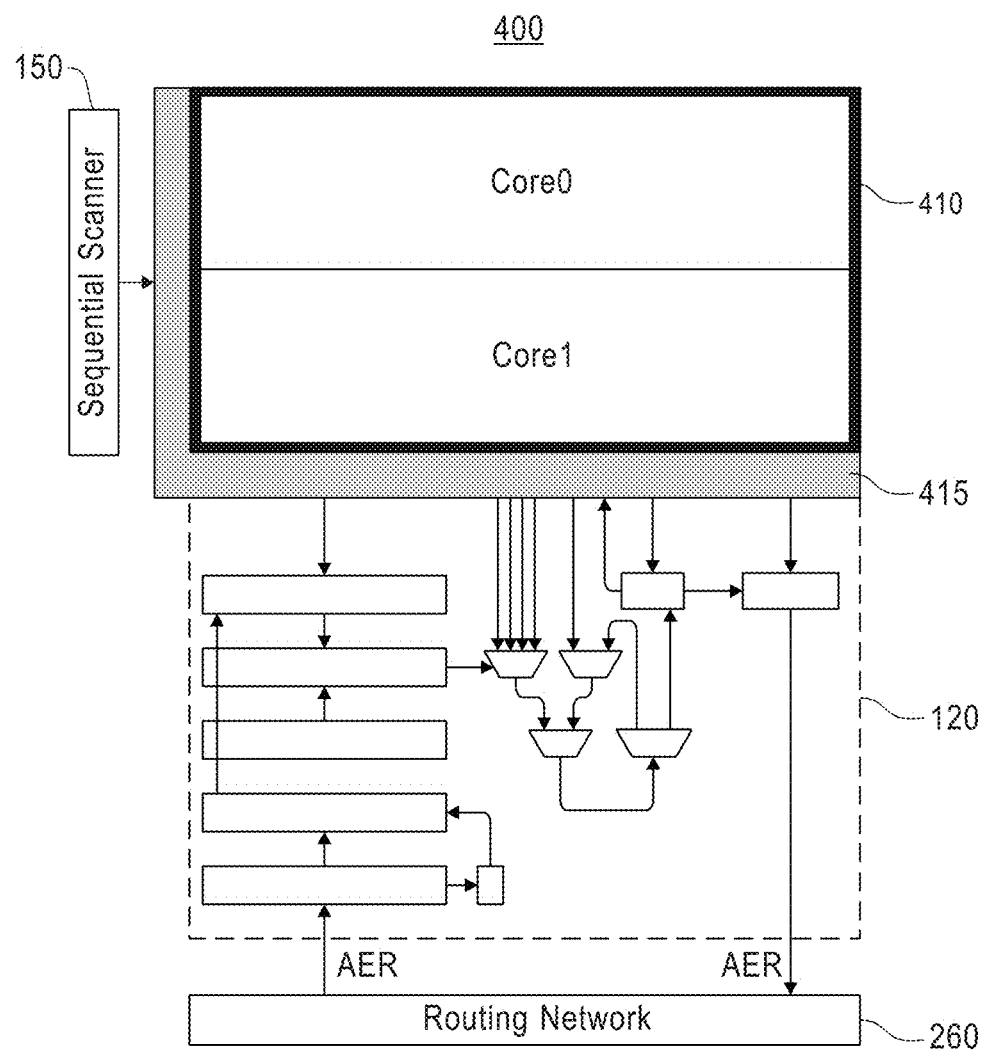
FIG. 10 illustrates a tall meta-core, in accordance with an embodiment of the invention.

FIG. 10 illustrates a tall meta-core 400, in accordance with an embodiment of the invention. The meta-core 400 is a multiplexed neural network system. The meta-core 400 comprises a tall memory device 410 maintaining neuronal attributes for multiple neurons 11 belonging to different core circuits 10. The memory device 410 includes multiple subsets 412 (FIG. 11), wherein each subset 412 maintains neuronal attributes for neurons 11 of a core circuit 10. Each subset 412 includes multiple entries 411, wherein each entry 411 maintains neuronal attributes for a neuron 11. For each entry 411, the neuronal attributes for a neuron 11 includes synaptic connectivity information, neuron parameters, and routing information.

Consolidating data into a tall memory device 410 reduces passive power consumption without increasing the overall active power consumption. The meta-core 400 further comprises a controller (i.e., a processing and computation logic circuit) 120. The neurons 11 represented by the memory device 410 are multiplexed, such that each neuron 11 represented by a entry 411 of the memory device 110 shares the controller 120 with other neurons 11 represented by other entries 411 of the memory device 410. As such, neurons 11 of different core circuits 10 share the same controller 120. A memory interface circuit 415 bridges the memory device 410 with the controller 120.

The decoder 131 of the controller 120 is configured to receive address-event packets from the routing network 260. The encoder 146 of the controller 120 is configured to send address-event packets to the routing network 260.

Figure 11:
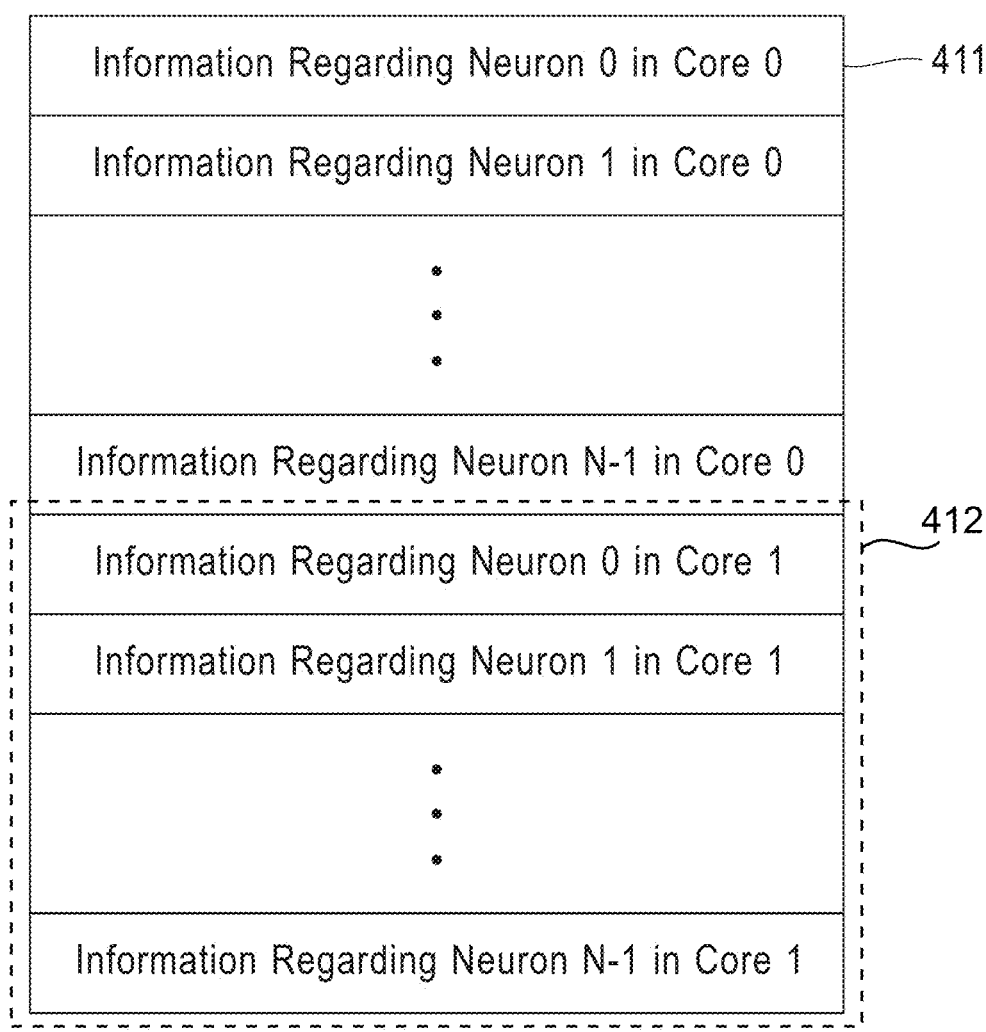
FIG. 11 is a block diagram showing a tall memory device of a tall meta-core, in accordance with an embodiment of the invention.

FIG. 11 is a block diagram showing a tall memory device 410 of a tall meta-core 400, in accordance with an embodiment of the invention. As stated above, the tall memory device 410 maintains neuronal attributes for multiple neurons 11 belonging to different core circuits 10. The memory device 410 includes multiple subsets 412, wherein each subset 412 maintains neuronal attributes for neurons 11 of a core circuit 10. Each subset 412 includes multiple entries 411, wherein each entry 411 maintains neuronal attributes for a neuron 11. For each entry 411, the neuronal attributes for a neuron 11 includes synaptic connectivity information, neuron parameters, and routing information.

Figure 12:
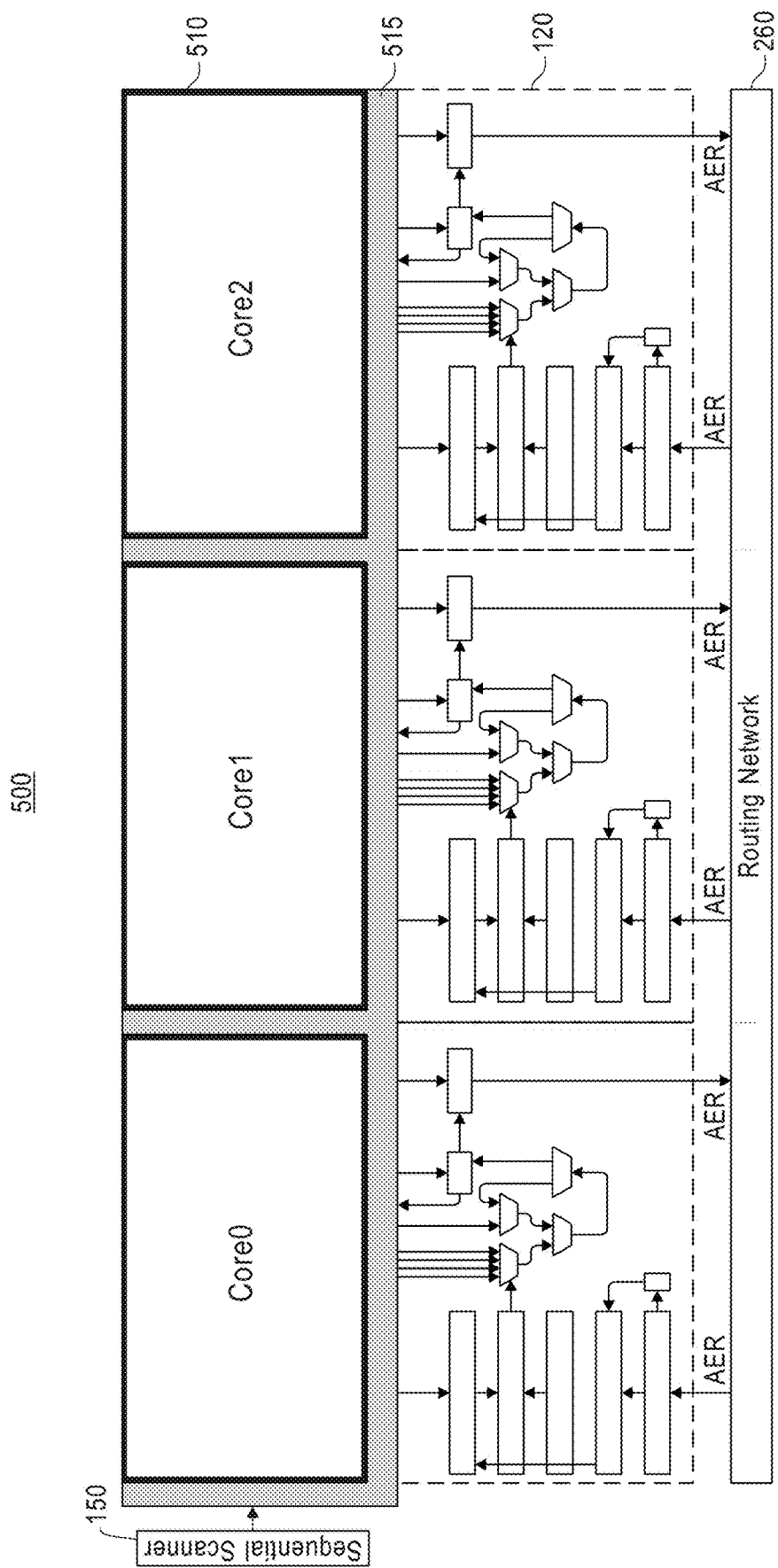
FIG. 12 illustrates a wide meta-core, in accordance with an embodiment of the invention.

FIG. 12 illustrates a wide meta-core 500, in accordance with an embodiment of the invention. The meta-core 500 is a multiplexed neural network system. The meta-core 500 comprises a wide memory device 510 maintaining neuronal attributes for multiple neurons 11 belong to different core circuits 10. The memory device 510 includes multiple subsets 512, wherein each subset 512 of the memory device 510 maintains neuronal attributes of neurons 11 of a core circuit 10. Each subset 512 may be divided into multiple entries 511, wherein each entry 511 maintains neuronal attributes for a neuron 11. In one example implementation, the number of entries 511 each subset 512 comprises is equal to the number of core circuits 10 that the memory device 510 represents. For each entry 511, the neuronal attributes for a neuron 11 maintained in said entry 511 includes synaptic connectivity information, neuron parameters, and routing information.

Consolidating data into a wide memory device 510 reduces passive power consumption. The meta-core 500 further comprises multiple controllers (i.e., processing and computation logic circuits) 120. In one embodiment, a meta-core 500 comprising N neurons may comprise α controllers (i.e., processing and computation logic circuits) 120 for the N neurons, wherein α is a positive integer and $1 \leq \alpha < N$. In one example implementation, each subset 512 that the memory device 510 has a corresponding controller (i.e., a corresponding processing and computation logic circuit) 120. As such, neurons 11 of the same core circuit 10 share the same controller 120. During operation, each entry 511 of each subset 512 is read out fully, and neuronal attributes of said entry 511 is independently processed by the controller 120 of said subset 512.

FIG. 13 is a block diagram showing a wide memory device 510 of a wide meta-core 500, in accordance with an embodiment of the invention. As stated above, the wide memory device 510 maintaining neuronal attributes for multiple neurons 11 belong to different core circuits 10. The memory device 510 includes multiple subsets 512, wherein each subset 512 of the memory device 510 maintains neuronal attributes of neurons 11 of a core circuit 10. Each subset 512 may be divided into multiple entries 511, wherein each entry 511 maintains neuronal attributes for a neuron 11. In one example implementation, the number of entries 511 each subset 512 comprises is equal to the number of core circuits 10 that the memory device 510 represents. For each entry 511, the neuronal attributes for a neuron 11 maintained in said entry 511 includes synaptic connectivity information, neuron parameters, and routing information.

Figure 14:
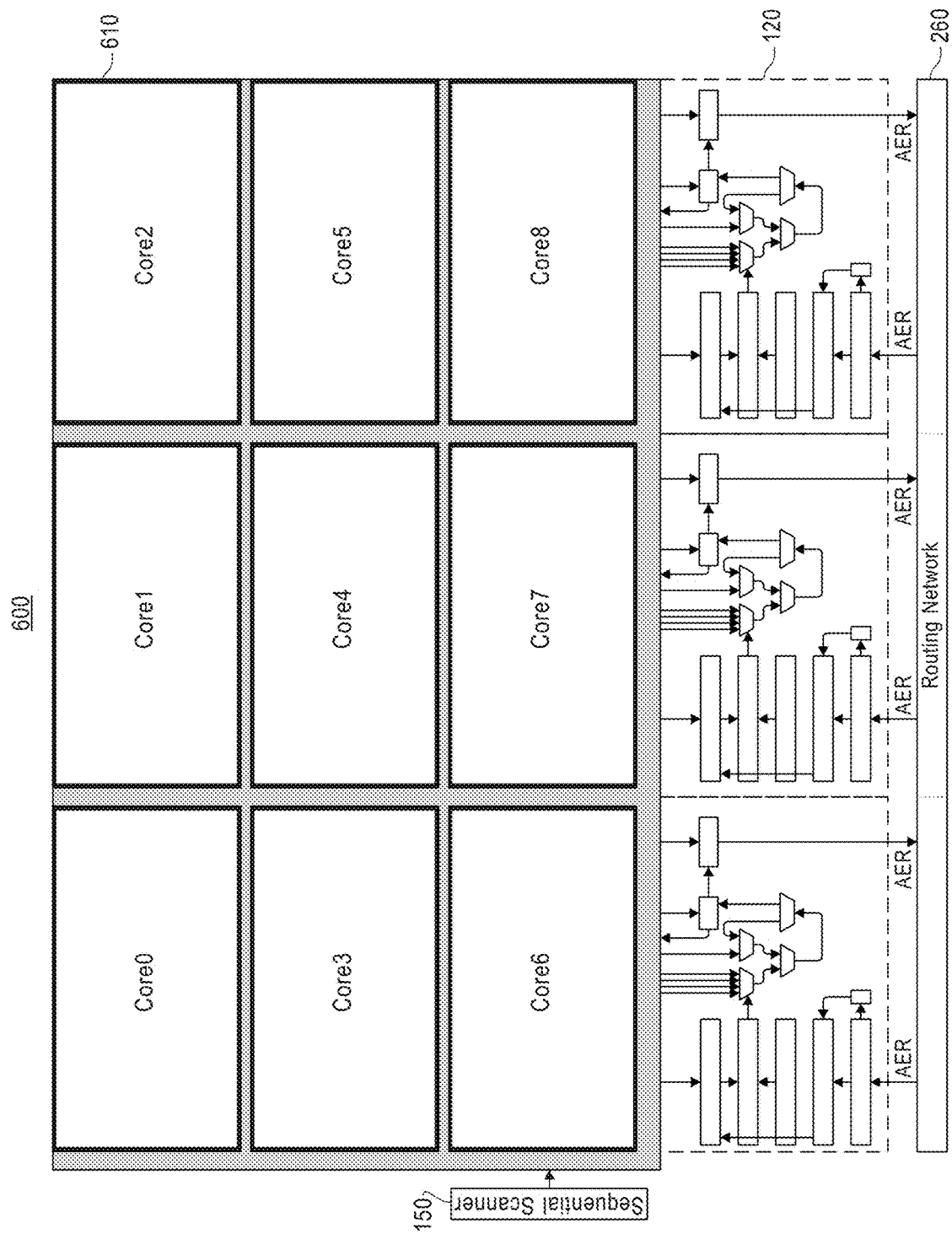
FIG. 14 illustrates a meta-core, in accordance with an embodiment of the invention.

FIG. 14 illustrates a meta-core 600, in accordance with an embodiment of the invention. The meta-core 600 is a multiplexed neural network system. The meta-core 600 comprises a memory device 610 maintaining neuronal attributes for multiple neurons 11 (FIG. 1) belonging to different core circuits 10 (FIG. 1). As shown in FIG. 14, the memory device 610 maintains neuronal attributes for neurons 11 belonging to core circuits Core0, Core1, Core2, . . . , Core8. Consolidating data for multiple core circuits 10 into the memory device 610 reduces passive power consumption.

The memory device 610 has multiple subsets 612 (FIG. 15), wherein each subset 612 maintains neuronal attributes for neurons 11 of a core circuit 10. Each subset 612 has multiple entries 611 (FIG. 15), wherein each entry 611 maintains neuronal attributes for a neuron 11. For each entry 611, the neuronal attributes maintained in said entry 611 includes synaptic connectivity information, neuron parameters, and routing information for a neuron 11.

The meta-core 600 further comprises multiple controllers (i.e., processing and computation logic circuits) 120. In one embodiment, a meta-core 600 comprising N neurons may comprise α controllers (i.e., processing and computation logic circuits) 120 for the N neurons, wherein α is a positive integer and 1≤α<N. In one example implementation, the subsets 612 of the memory device 610 are organized into multiple groups 614 (FIG. 15). Each group 614 comprises multiple subsets 612 representing different core circuits 10. Each group 614 has a corresponding controller (i.e., processing and computation logic circuit) 120, such that neurons 11 of the said group 614 share the same controller 120. During operation, each entry 611 of each subset 612 of each group 614 is read out, and neuronal attributes maintained in said entry 611 is independently processed by the controller 120 for said group 614.

As shown in FIG. 14, data for the core circuits Core0, Core3, and Core6 share a first controller 120, data for the core circuits Core1, Core4, and Core7 share a second controller 120, and data for the core circuits Core2, Core5, and Core8 share a third controller 120.

In one embodiment, neurons updates for the core circuits 10 are performed sequentially, such that neurons 11 are updated one at a time. In one example implementation, only one controller 120 for a core circuit 10 is used during a neuron update. When a neuron update for a neuron 11 is completed, the meta-core 600 advances to the next neuron 11, until all neurons 11 are processed. Therefore, as the number of neurons 11 increase (and as the number of synapses 31 increase), the amount of time it takes for a controller 120 to complete neuron updates for a core circuit 10 also increases. If this time exceeds the duration of a time step, the controller 120 will not be able to finish neuron updates for a core circuit 10 within a time step. Therefore, the optimal height of the memory device 610 should be based on the largest possible number of neurons 11 that a controller 120 can process within a time step. For example, if the controller 120 operates at 100 MHz and all neurons 11 must be processed within a 1 ms time step, wherein 1000 ticks are needed to process a neuron 11, the memory device 610 can have only 100 entries 611. Determining the optimal width of the memory device 610 is process-dependent.

In another embodiment, neuron updates for the core circuits 10 are performed in parallel. In one example implementation, the controllers 120 for different core circuits 10 are used in parallel. Changes in the membrane potential variable for the neurons 11 of some core circuits 10 (i.e., slave core circuits) may be collected, and data for one core circuit 10 (i.e., a master core circuit 10) is updated based on the changes collected. As the neuron updates for the core circuits 10 are performed in parallel, the time for neuron updates is independent of the size of the meta-core.

FIG. 15 is a block diagram showing a memory device 610 of a meta-core 600, in accordance with an embodiment of the invention. As stated above, the memory device 610 maintains neuronal attributes for multiple neurons 11 belonging to different core circuits 10. The memory device 610 includes multiple subsets 612, wherein each subset 612 of the memory device 610 maintains neuronal attributes for neurons 11 of a core circuit 10. Each subset 612 has multiple entries 611, wherein each entry 611 maintains neuronal attributes for a neuron 11. For each entry 611, the neuronal attributes maintained in said entry 611 includes synaptic connectivity information, neuron parameters, and routing information for a neuron 11. In one example implementation, the subsets 612 are organized into multiple groups 614, wherein each group 614 comprises multiple subsets 612 representing different core circuits 10.

As shown in FIG. 15, data for the core circuits Core0, Core3, and Core6 are organized into a first group 614, data for the core circuits Core1, Core4, and Core1 are organized into a second group 614, and data for the core circuits Core2, Core5, and Core8 are organized into a third group 614.

Figure 16:
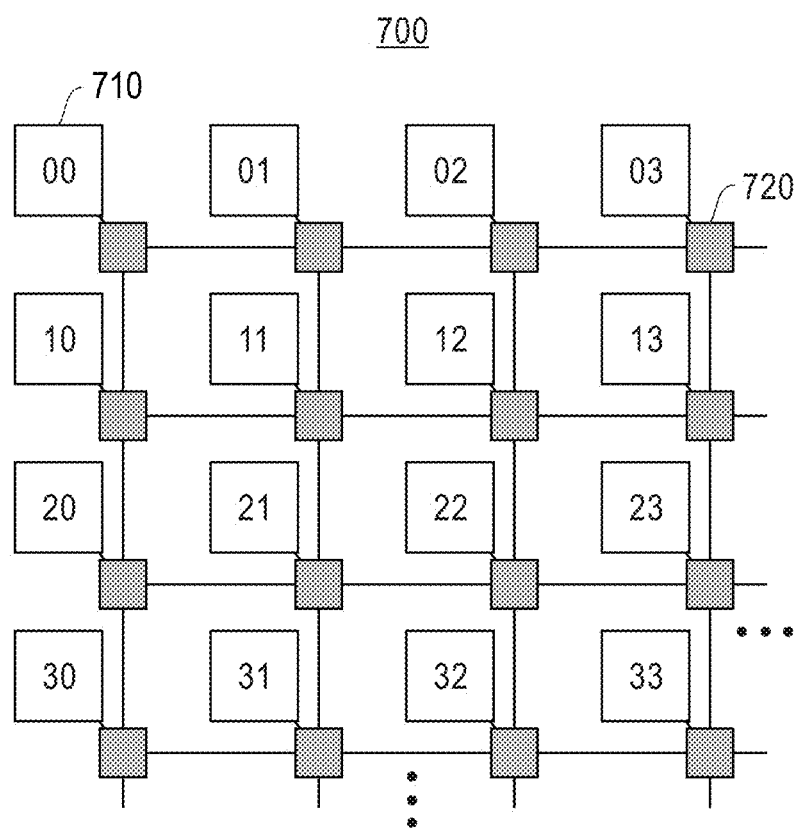
FIG. 16 illustrates a neural network, in accordance with an embodiment of the invention.

FIG. 16 illustrates a neural network 700, in accordance with an embodiment of the invention. The neural network comprises multiple cores 710. The cores 710 may be multiplexed core circuits 100, tall meta-cores 400, wide meta-cores 500, or meta-cores 600. Each core 710 has a corresponding router 720 for passing along address-event packets to neighboring routers 200 in the northbound, southbound, eastbound, and westbound directions.

Figure 17:
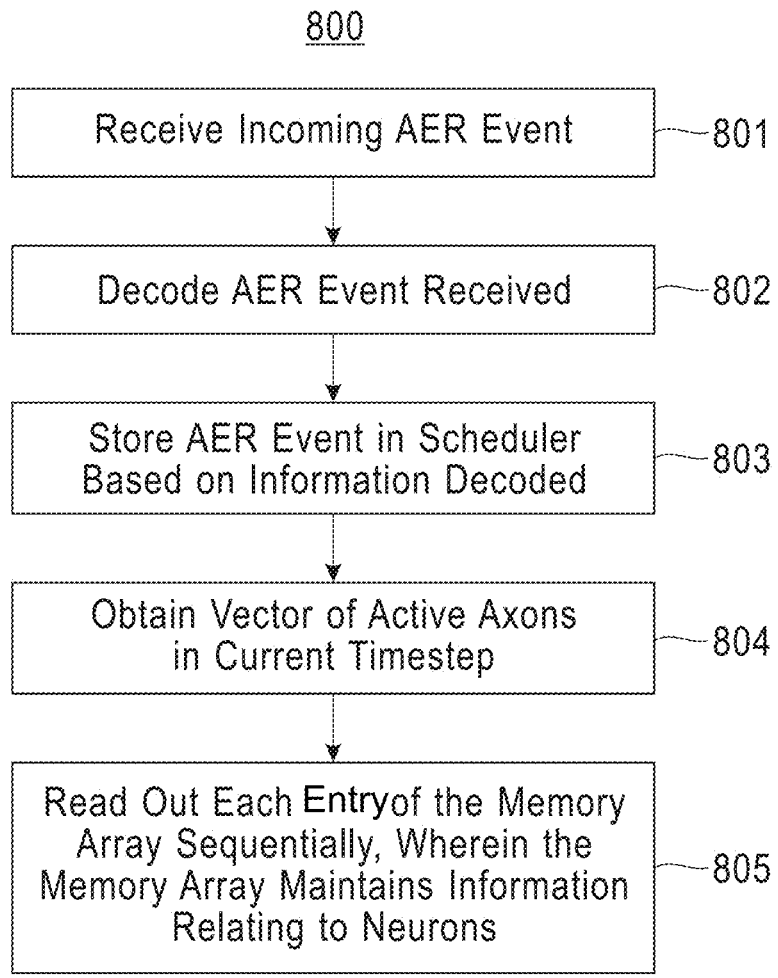
FIG. 17 illustrates a flowchart of an example process for processing firing events in a multiplexed core circuit, in accordance with an embodiment of the invention.

FIG. 17 illustrates a flowchart of an example process 800 for processing firing events in a multiplexed core, in accordance with an embodiment of the invention. In process block 801, address-event packets (AER events) are received. In process block 802, each address-event packet received is decoded. In process block 803, decoded address-event packets are stored in a scheduler based on the information decoded. In process block 804, a vector of active axons in the current time step is obtained from the scheduler. In process block 805, each entry of a memory device is read out sequentially, wherein the memory device maintains information relating to neurons.

Figure 18:
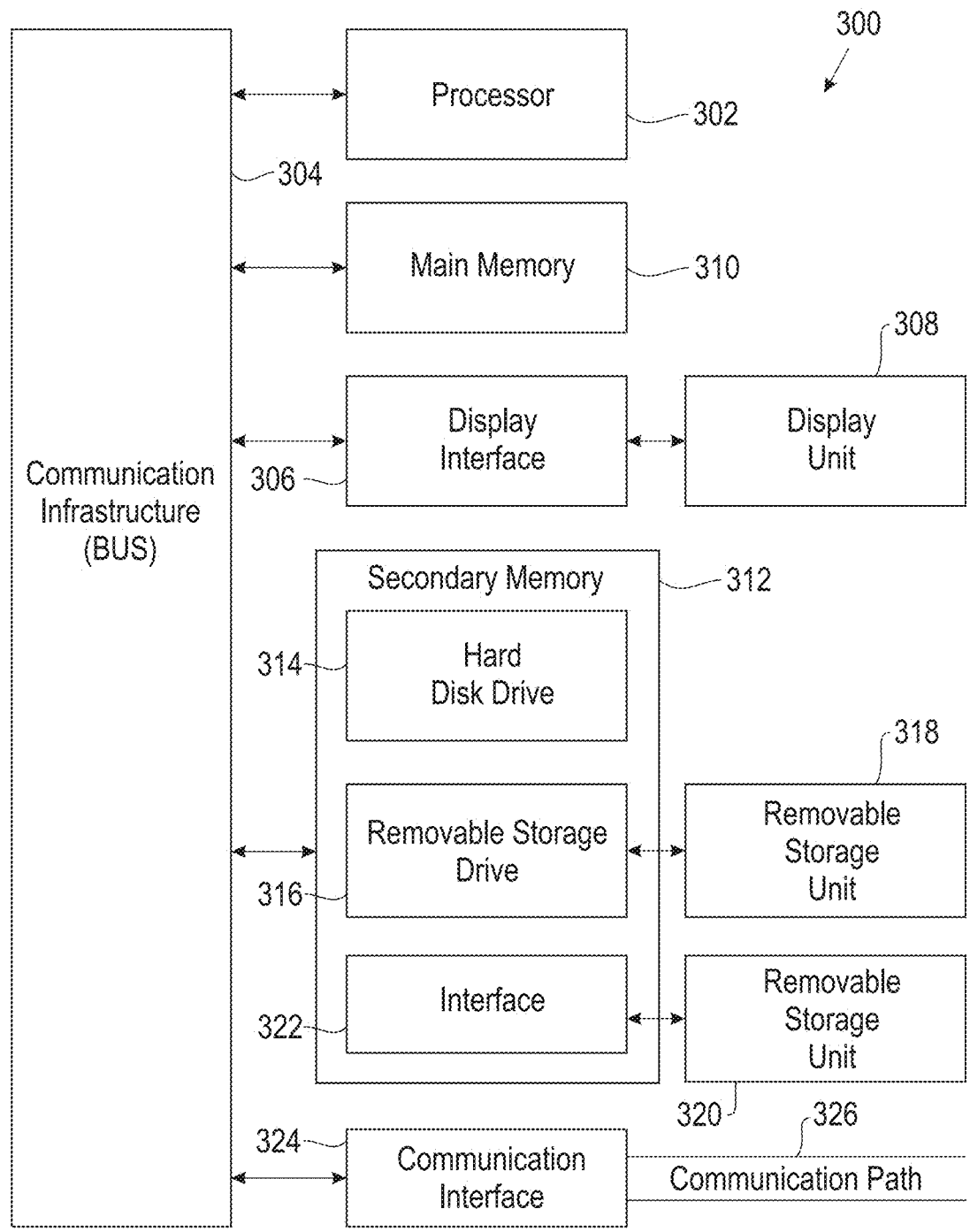
FIG. 18 is a high level block diagram showing an information processing system useful for implementing one embodiment of the invention.

FIG. 18 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A multiplexed neural network system, comprising:
a memory device comprising multiple entries that maintain data for multiple neural core circuits, wherein each neural core circuit of the multiple neural core circuits comprises a plurality of neurons, wherein the data maintained in the memory device comprises neuronal attributes for all neurons of the multiple neural core circuits, wherein the memory device is scaled in at least one dimension and the neuronal attributes maintained in the memory device are arranged based on the at least one dimension, and wherein each entry of the memory device corresponds to a neuron of all the neurons of the multiple neural core circuits and maintains at least one corresponding neuronal attribute including synaptic connectivity information for the neuron, neuron parameters for the neuron, and routing information for the neuron; and
at least one controller, wherein the at least one controller multiplexes computation and control logic for all the neurons of the multiple neural core circuits by processing neuronal firing events targeting all the neurons of the multiple neural core circuits, wherein the processing comprises:
reading out sequentially entries of the memory device; and
for each entry of the memory device read out, integrating a neuronal firing event targeting a neuron corresponding to the entry by:
updating a neuron parameter for the neuron that represents a membrane potential variable of the neuron based on the neuronal firing event and at least one neuronal attribute included in the entry; and
writing the neuron parameter updated to the same entry of the memory device.

2. The multiplexed neural network system of claim 1, wherein:

the multiple entries of the memory device are organized into multiple subsets; and each subset of the multiple subsets corresponds to a neural core circuit of the multiple neural core circuits, and, for each neuron of the corresponding neural core circuit, the subset includes an entry maintaining at least one neuronal attribute for the neuron.

3. The multiplexed neural network system of claim 2, wherein:

the at least one dimension comprises a height dimension;
the memory device is scaled in the height dimension, such that the memory device has multiple rows; and
the multiple entries of the memory device are organized into the multiple subsets by dividing the multiple rows into the multiple subsets.

4. The multiplexed neural network system of claim 3, wherein:

the at least one controller comprises only a single controller; and
the neuronal firing events targeting all the neurons of the multiple neural core circuits are processed by the single controller, such that the multiple neural core circuits share the single controller.

5. The multiplexed neural network system of claim 4, wherein:

an optimal height of the memory device is based on a maximum number of neurons that the single controller can process neuronal firing events for within a time step.

6. The multiplexed neural network system of claim 2, wherein:

the at least one dimension comprises a width dimension;
the memory device is scaled in the width dimension, such that the memory device has multiple columns; and
the multiple entries of the memory device are organized into the multiple subsets by dividing the multiple columns into the multiple subsets.

7. The multiplexed neural network system of claim 6, wherein:

the at least one controller comprises multiple controllers; and
each subset of the multiple subsets has a corresponding controller included in the multiple controllers and configured to process neuronal firing events targeting neurons of a corresponding neural core circuit based on at least one neuronal attribute maintained in the sub set.

8. The multiplexed neural network system of claim 2, wherein:

the at least one dimension comprises a height dimension and a width dimension;
the memory device is scaled in the height dimension and the width dimension, such that the memory device has multiple rows and multiple columns;
the multiple entries of the memory device are organized into the multiple subsets by dividing the multiple rows and multiple columns into the multiple subsets; and
the multiple subsets are organized into multiple groups, wherein each group corresponds to two or more neural core circuits of the multiple neural core circuits.

9. The multiplexed neural network system of claim 8, wherein:

the at least one controller comprises multiple controllers; and
each group has a corresponding controller included in the multiple controllers and configured to process neuronal firing events targeting neurons of two or more corresponding neural core circuits based on at least one neuronal attribute maintained in at least one subset of the group, such that the two or more corresponding neural core circuits share the corresponding controller.

10. The multiplexed neural network system of claim 9, wherein:

all the neurons of the multiple neural core circuits are updated sequentially.

11. The multiplexed neural network system of claim 9, wherein:

all the neurons of the multiple neural core circuits are updated in parallel.

12. The multiplexed neural network system of claim 1, wherein:

the data maintained in the memory device reduces passive power consumption as the data consolidates the neuronal attributes for all the neurons of the multiple neural core circuits.

13. A method, comprising:

maintaining data for multiple neural core circuits in a memory device comprising multiple entries, wherein each neural core circuit of the multiple neural core circuits comprises a plurality of neurons, wherein the data maintained in the memory device comprises neuronal attributes for all neurons of the multiple neural core circuits, wherein the memory device is scaled in at least one dimension and the neuronal attributes maintained in the memory device are arranged based on the at least one dimension, and wherein each entry of the memory device corresponds to a neuron of all the neurons of the multiple neural core circuits and maintains at least one corresponding neuronal attribute including synaptic connectivity information for the neuron, neuron parameters for the neuron, and routing information for the neuron; and multiplexing computation and control logic for all the neurons of the multiple neural core circuits via at least one controller by processing neuronal firing events targeting all the neurons of the multiple neural core circuits via the at least one controller, wherein the processing comprises:

reading out sequentially entries of the memory device; and for each entry of the memory device read out, integrating a neuronal firing event targeting a neuron corresponding to the entry by:

updating, via the at least one controller, a neuron parameter for the neuron that represents a membrane potential variable of the neuron based on the neuronal firing event and at least one neuronal attribute included in the entry; and writing, via the at least one controller, the neuron parameter updated to the same entry of the memory device.

14. The method of claim 13, wherein:

the multiple entries of the memory device are organized into multiple subsets; and each subset of the multiple subsets corresponds to a neural core circuit of the multiple neural core circuits, and, for each neuron of the corresponding neural core circuit, the subset includes an entry maintaining at least one neuronal attribute for the neuron.

15. The method of claim 14, wherein:

the at least one dimension comprises a height dimension;
the memory device is scaled in the height dimension, such that the memory device has multiple rows; and the multiple entries of the memory device are organized into the multiple subsets by dividing the multiple rows into the multiple subsets.

16. The method of claim 15, wherein:

the at least one controller comprises only a single controller; and the neuronal firing events targeting all the neurons of the multiple neural core circuits are processed by the single controller, such that the multiple neural core circuits share the single controller.

17. The method of claim 14, wherein:

the at least one dimension comprises a width dimension;

the memory device is scaled in the width dimension, such that the memory device has multiple columns; and the multiple entries of the memory device are organized into the multiple subsets by dividing the multiple columns into the multiple subsets.

18. The method of claim 17, wherein:

the at least one controller comprises multiple controllers; and each subset of the multiple subsets has a corresponding controller included in the multiple controllers and configured to process neuronal firing events targeting neurons of a corresponding neural core circuit based on at least one neuronal attribute maintained in the sub set.

* * * * *